United States Patent [19]

Buschmann

[11] Patent Number: 5,105,903
[45] Date of Patent: Apr. 21, 1992

[54] BRAKE SYSTEM WITH ANTI-LOCK CONTROL FOR ALL-WHEEL DRIVEN AUTOMOTIVE VEHICLES

[75] Inventor: Gunther Buschmann, Griesheim, Fed. Rep. of Germany

[73] Assignee: Alfred Teves GmbH, Frankfurt am Main, Fed. Rep. of Germany

[21] Appl. No.: 925,808

[22] Filed: Oct. 29, 1986

[30] Foreign Application Priority Data

Oct. 29, 1985 [DE] Fed. Rep. of Germany ....... 3538351

[51] Int. Cl.⁵ .................................................. B60T 8/32
[52] U.S. Cl. .................................... 180/249; 180/197; 188/181 A; 303/100; 303/111; 303/119.1; 303/119 R
[58] Field of Search ............... 180/249, 248, 247, 233, 180/197, 244, 242, 243, 308, 6.48; 364/424, 424.1, 426; 188/181 A; 303/111, 113, 119, 100

[56] References Cited

U.S. PATENT DOCUMENTS

| 3,544,171 | 12/1970 | Lester et al. .................. 188/181 A |
| 4,418,966 | 12/1983 | Hattwig ............................. 303/100 |
| 4,552,241 | 11/1985 | Suzuki .............................. 180/197 X |
| 4,601,359 | 7/1986 | Weismann et al. ................. 180/248 |
| 4,605,087 | 8/1986 | Ashauer et al. .................... 180/248 |
| 4,640,557 | 2/1987 | Panizza et al. ..................... 303/100 |
| 4,643,492 | 2/1987 | Belart et al. ....................... 303/119 |
| 4,671,373 | 6/1987 | Sigl ................................... 180/197 |
| 4,688,858 | 8/1987 | Fennel et al. ...................... 303/114 X |
| 4,700,797 | 10/1987 | Leiber ................................ 180/197 |
| 4,715,665 | 12/1987 | Ostwald ............................. 303/111 |
| 4,745,987 | 5/1988 | Buschmann ........................ 180/197 |
| 4,746,173 | 5/1988 | Fennel et al. ...................... 303/100 |

FOREIGN PATENT DOCUMENTS

| 3527959 | 2/1987 | Fed. Rep. of Germany ...... 180/197 |
| 2313243 | 2/1977 | France ............................... 303/100 |
| 2140104 | 11/1984 | United Kingdom ............... 180/249 |
| 2154293 | 9/1985 | United Kingdom ............... 180/197 |
| 2181504 | 4/1987 | United Kingdom ............... 303/100 |
| 2182406 | 5/1987 | United Kingdom ............... 303/119 |
| 2183757 | 6/1987 | United Kingdom ............... 303/100 |

Primary Examiner—Mitchell J. Hill
Attorney, Agent, or Firm—Robert P. Seitter; J. Gordon Lewis

[57] ABSTRACT

A brake system with electronic anti-lock control for all-wheel driven automotive vehicles possesses two control channels, to which diagonally each one front wheel (VR or VL) and one rear wheel (HL or HR) are connected. Rotational speed sensors (24, 25) are provided at the front wheels only. During anti-lock or slip control, front wheels and rear wheels are coupled such that a brake torque is transmittable at least from the rear wheels to the front wheels. Preferably, brake torques are transmitted also from the front axle to the rear axle. For coupling, a differential lock (6) is arranged in the distribution differential (3) which lock is controllable by a signal of the anti-lock control system.

5 Claims, 1 Drawing Sheet

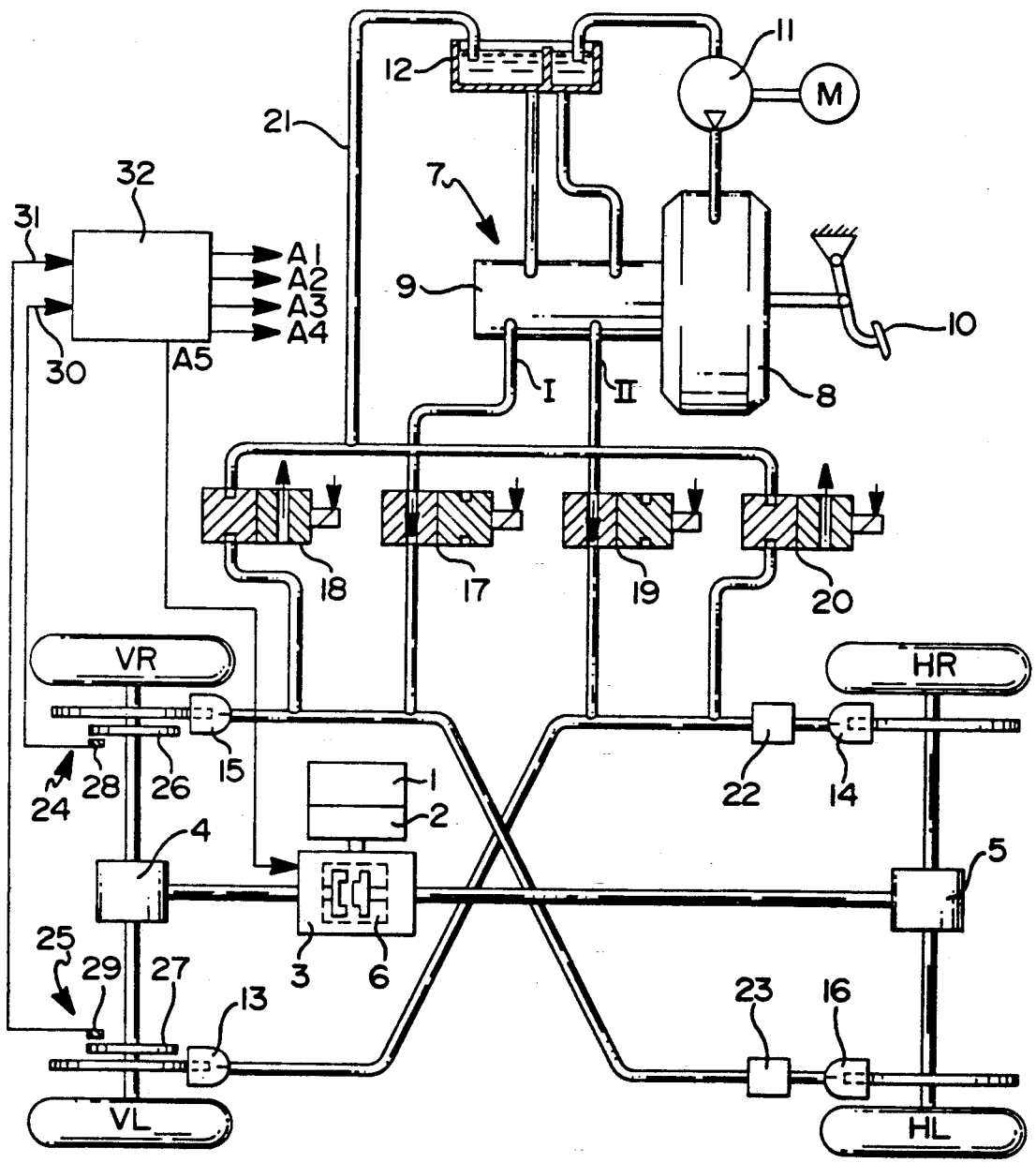

1

BRAKE SYSTEM WITH ANTI-LOCK CONTROL FOR ALL-WHEEL DRIVEN AUTOMOTIVE VEHICLES

BACKGROUND OF THE INVENTION

The present invention relates to a brake system with electronic anti-lock control for automotive vehicles with all-wheel drive and variable coupling of the drive between front axle and rear axle.

Brake systems with electronic anti-lock control are known whose principle necessitates the use of four, or at least three, wheel sensors. This is because a reference variable, the so-termed vehicle reference speed, is required for control of the brake slip. The reference variable is formed by logic combining of the individual measured values of the rotational speed of all wheels or of at least the front wheels and the rear axle and which is in all situations only 'correct' or apt for the control if measured values of all wheels are available. For example, according to German laid-open print 22 54 295 the formation of the reference variable makes a difference between driven and non-driven wheels.

In vehicles with all-wheel drive, however, the formation of this reference variable is considerably complicated by the coupling of all wheels by way of the drive shafts, by the transmission of drive torques and brake torques caused thereby as well as by the high moments of inertia at all wheels. The fixed coupling of the wheels among each other has a consequence that the wheels mutually influence each other, for which reason variations of the brake or friction force between tires and road can no longer be recognized definitely by measurement of the rotational behavior of the individual wheels and logic combining of the measured values. In many situations, coupling by way of the drive results in an almost synchronous behavior of all wheels, which renders it difficult to detect instability or an imminent locked condition. After engagement of the differential locks, these problems are even more pronounced.

Various measures to lessen these difficulties are known. In all cases, major efforts are required. At least, there is always need for an individual measurement of the rotational speed at all wheels. Simplified anti-lock systems with only two wheel sensors and merely two control channels fail to provide an effective solution.

A known brake system for all-wheel driven vehicles, provides for automatic de-activation of the anti-lock control when differential locks are engaged. This is a serious disadvantage because unfavorable road conditions necessitate both the differential locks and the anti-lock control to preserve drive stability.

Therefore, it is an object of the present invention to overcome the described shortcomings of the known anti-lock control systems and to provide a slip-controlled brake system for all-wheel driven vehicles which, in any situation, prevents locking of the wheels and ensures efficient braking at a short stopping distance and which, nevertheless, distinguishes by particularly little manufacturing effort.

SUMMARY OF THE INVENTION

This object is achieved by a brake system of the type referred to, the special feature thereof residing in that two control channels are provided to which diagonally each one front wheel and one rear wheel are connected. Each front wheel is furnished with a rotational speed sensor for the determination of the wheel rotational behavior and during anti-lock or slip control, front wheels and rear wheels are coupled such that a brake torque can be transmitted at least from the rear wheels to the front wheels, or in both directions.

Hence, the instant invention proposes an anti-lock control system which makes use of the special features of the all-wheel drive, that is the coupling of the wheels by way of the driving axles, with a view to improving and simplifying the control system. Finally, the new brake system affords manufacture at less cost. Previously, especially this coupling of all wheels presented a major obstacle in the development of an anti-lock control system suitable for vehicles with all-wheel drive, what had as a result restrictions (disconnection of the control when the differential is locked) and drawbacks in the formation of the vehicle reference speed.

For the brake system according to the present invention, two wheel sensors and only two control channels are sufficient. Merely two pairs of valves, inlet valve and outlet valve, or comparable valve assemblies are necessary to control the braking pressure.

According to an embodiment of the inventive brake system, the front-axle drive and the rear-axle drive are interconnected by way of a distribution differential which is equipped with a positive coupling serving as a differential lock. On the other hand, the invention also allows the use of operative couplings, if such are available in the distribution differential of the vehicle anyway or appear to be more favorable for other reasons. A visco-coupling whose locking effect increases with rising speed difference, or an operative lock generating a minimum locking torque are likewise suitable for locking the distribution differential. Expediently, depending on the type of brake system, the couplings in the distribution differential can be actuated by an electric, hydraulic or pneumatic signal of the anti-lock control system. For vehicles whose front-axle and rear-axle drive are coupled by way of a visco-coupling or the like, the invention brake system may likewise be employed, because the brake torque is transmitted from the rear axle to the front axle also in such devices.

Finally, another embodiment of the present invention resides in that the rear-axle and/or the front-axle differential likewise are provided with differential locks. Automatic engagement and disengagement of these locks in dependence on brake slip control is also possible.

The inventive design of the brake system and the simplification thereof in comparison to known systems is based on the knowledge that front-wheel sensors are sufficient to determine the rotational behavior of all wheels in all-wheel drive brake systems with two control channels and diagonal circuit allotment. This is because due to the stationary coupling by way of the locked distribution differential, locking of a rear wheel preconditions great brake slip on at least one front wheel. This great slip of the front wheel would be detectable by the front-wheel speed sensor, would lead to presume an instability and thus would initiate pressure reduction. Hence it follows that a tendency of a rear wheel to instability can be detected by means of the front-wheel sensors.

As previously known, brake systems are dimensioned such that under all conditions (on de-activation of slip control) first the front wheels and only then the rear wheels are allowed to lock. The construction which is a legal provision in many countries results in rather low braking forces at the rear axle because the most unfavorable case had been made the basis for the construction. Ensuing therefrom is uneven wear of the front-wheel and rear-wheel brakes and, above all, loss in braking power which proves to be theoretically possible by a longer stopping distance. When using the inventive anti-lock control system, however, locking of the differentials and coupling of all wheels accomplishes approximately the same brake slip at front and rear axle. Consequently, there occurs transmission of brake torque from the front axle to the rear axle. This means, despite the described simplification, the present invention accomplishes increased efficiency of the slip-controlled or anti-lock brake system.

BRIEF DESCRIPTION OF THE DRAWING

Further features, advantages and possibilities of application of this invention can be gathered from the following description of an embodiment by way of the accompanying drawing wherein the single FIGURE, in a schematically simplified view, illustrates the most important components and the hydraulic connections of the brake system of the inventive type are illustrated. The driving track of the vehicle for which the brake system is provided is likewise illustrated symbolically.

DETAILED DESCRIPTION

Referring to the drawing, a vehicle with all-wheel drive is illustrated. A distribution differential 3 is connected to a drive motor 1 by way of a gear 2 actuated manually or automatically. The differential 3 distributes the driving torque by way of a front-axle differential 4 and a rear-axle differential 5 onto the front wheels VR, VL and the rear wheels HR, HL. The distribution differential 3 is equipped with an operative differential lock 6. As previously discussed with reference to other embodiments, differential 4 and differential 5 also may be respectively equipped with an operative differential lock.

In the embodiment illustrated, the anti-lock brake system is composed of a braking pressure generator 7 with hydraulic boosting which, in turn, is composed of the actual hydraulic booster 8 and a tandem master cylinder 9. Details have not been drawn. The braking pressure generator 7 is actuated with the aid of a brake pedal 10. Auxiallary hydraulic energy for boosting of the brake force exerted on the pedal 10 is supplied by an electromotively driven hydraulic pump 11 which, in conventional practice, like the master cylinder 9 is connected to a pressure-compensating and pressure-fluid supply reservoir 12. By way of two hydraulic brake circuits I, II, one front-wheel brake each and the diagonal rear-wheel brake 12, 14; 15, 16 are connected. Disc brakes are illustrated symbolically herein.

To control the braking pressure, each brake circuit I, II is furnished with a pair of valves 17, 18; 19, 20, that is to say, one inlet valve 17, 19 and one outlet valve 18, 20 each. The valves herein are electromagnetically actuable two-way/two-position directional control valves, the inlet valves 17, 19 thereof being switched to open passage in their de-energized condition, whilst the outlet valves 18, 20 normally close the pressue-fluid conduit by way of the return line 21 to the reservoir 12. Furthermore, the two brake circuits I, II in the hydraulic conduit to the rear-wheel brakes 14, 16 still contain each one brake-force distributing valve 22, 23 which allows to influence in a known manner the brake force distribution in order to balance the variable deceleration responsive axle load distribution onto front and rear axle.

To measure the wheel rotational behavior and thus to control the brake slip upon the occurrence of an imminent locked condition, the front wheels VR, VL are equipped with each one rotational speed sensor 24, 25 which in each case consists of a disc 26, 27 co-rotating with the wheel or the driving axle, respectively, and an inductive pickup for measuring data 28, 29. By way of signal lines 30, 31, the information about the wheel rotational behavior is delivered to an electronic control unit 32 which processes the signals and generates control signals which, by way of non-illustrated electric signal lines, are supplied from the outlets A1 to A4 of the control unit 32 to the electromagnetically actuable valves 17 to 20. These valves allow in a known manner to maintain the braking pressure constant, to achieve braking pressure reduction as well as renewed pressure build-up individually in the two brake circuit I, II. Further, the control unit 32 possesses an outlet A5 by way of which an electric control signal is delivered to the distribution differential 3. This signal at outlet A5 permits control of the engagement and disengagement of the coupling 6 serving as a differential lock.

By way of parallel signal lines and similar couplings, it would likewise be possible to lock the rear-axle differential 5, if expedient, in response to the brake-slip control signal. The provision of a differential lock in the front-axle differential 4, however, is assumed to be restricted to special cases, since such locks have detrimental effects on the steering behavior, as is known.

Instead of the control of the lock 6 by way of the control unit 32, likewise a pressure signal dependent on the start of brake slip control could be made use of for the actuation of a corresponding coupling or differential lock, respectively. The auxiliary pressure developing in known systems upon the commencement of slip control would be an appropriate source for this purpose.

What is claimed is:

1. A brake system with electronic anti-lock control means for an automotive vehicle with all-wheel drive and a controllable differential lock coupling between the front axle and the rear axle of the vehicle, comprising, in combination: two control channels in which each front wheel (VR, VL) and one rear wheel (HL, HR) are respectively diagonally connected, each front wheel being provided with a rotational speed sensor (24, 25) for the determination of the wheel rotational behavior and wherein, during anti-lock control provided by said means, the front wheels (VR, VL) and the rear wheels (HR, HL) are coupled by way of a distribution differential having a differential lock, wherein said differential lock transmits a brake torque by way of a front axle differential and a rear axle differential at the wheels of a driving axle, said brake torque being transmitted at last from said rear wheels (HR, HL) to said front wheels (VR, VL) by way of said differential lock.

2. The brake system according to claim 1, wherein said rear axle includes separate differential lock means which is locked by said electronic anti-lock control means during said anti-lock control.

3. The brake system according to claim 1, wherein said front axle includes separate differential lock means which is locked by said electronic anti-lock control means during said anti-lock control.

4. The brake system according to claim 3 wherein said rear axle includes a separate differential lock means which is locked by said electronic anti-lock control means during said anti-lock control.

5. The brake system according to claim 1, wherein said differential lock also transmits said brake torque developed at said front wheels from said front wheels (VR, VL) to said rear wheels.

* * * * *